United States Patent
Debusk et al.

(10) Patent No.: US 11,872,543 B2
(45) Date of Patent: Jan. 16, 2024

(54) HYDROTHERMALLY STABLE METHANE OXIDATION CATALYST

(71) Applicant: UT-Battelle, LLC, Oak Ridge, TN (US)

(72) Inventors: Melanie M. Debusk, Oak Ridge, TN (US); Sreshtha Sinha Majumdar, Oak Ridge, TN (US); Josh A. Pihl, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/739,263

(22) Filed: May 9, 2022

(65) Prior Publication Data

US 2022/0362747 A1  Nov. 17, 2022

Related U.S. Application Data

(60) Provisional application No. 63/186,965, filed on May 11, 2021.

(51) Int. Cl.

| | | |
|---|---|---|
| *B01J 29/74* | (2006.01) | |
| *B01J 23/44* | (2006.01) | |
| *B01J 21/10* | (2006.01) | |
| *B01J 29/70* | (2006.01) | |
| *B01J 37/02* | (2006.01) | |
| *B01J 35/10* | (2006.01) | |
| *B01J 35/04* | (2006.01) | |
| *C01B 39/48* | (2006.01) | |
| *B01J 37/08* | (2006.01) | |

(52) U.S. Cl.
CPC .............. *B01J 23/44* (2013.01); *B01J 21/10* (2013.01); *B01J 29/7015* (2013.01); *B01J 35/04* (2013.01); *B01J 35/1014* (2013.01); *B01J 37/0207* (2013.01); *B01J 37/08* (2013.01); *C01B 39/48* (2013.01); *C01P 2006/12* (2013.01); *C01P 2006/16* (2013.01)

(58) Field of Classification Search
CPC ... B01J 21/04; B01J 21/10; B01J 23/44; B01J 29/7015; B01J 29/743; B01J 35/1014; B01J 37/0201; B01J 37/0207; B01J 37/0205; B01J 37/08; C01P 2006/12; C01P 2006/16
USPC ............ 502/60, 74, 300, 326, 327, 328, 355
See application file for complete search history.

(56) References Cited

FOREIGN PATENT DOCUMENTS

WO  WO 2017/216728  * 12/2017

OTHER PUBLICATIONS

Ying-Ying et al., "Pd/Al2O3 catalysts modified with Mg for catalytic combustion of methane: Effect of Mg/Al mole ratios on the supports and active PdOx formation", J. Fuel Chem. Technol., 2019, 47(10), 1235-1244.*

Liu et al, "Influence of Metal Oxides on the Performance of Pd/Al2O3 Catalysts for Methane Combustion Under Lean-Fuel Conditions," Fuel Processing Technology 111 (2013): 55-61.

Hu et al., "Enhancement of Activity and Hydrothermal Stability of Pd/ZrO2-Al2O3 Doped by Mg for Methane Combustion Under Lean Conditions," Fuel 194 (2017): 368-374.

* cited by examiner

*Primary Examiner* — Elizabeth D Wood
(74) *Attorney, Agent, or Firm* — WARNER NORCROSS + JUDD LLP

(57) ABSTRACT

A method of manufacturing a methane oxidation catalyst and methane oxidation catalysts formed by the method are provided. The method includes providing a palladium (Pd)-based catalyst including Pd dispersed onto a support. A magnesium (Mg) precursor is introduced to the Pd-based catalyst by one of ion exchange or incipient wetness impregnation. After introducing the magnesium precursor to the Pd-based catalyst, the catalyst is dried and subjected to a final heat treatment that includes hydrothermal calcination. A method of methane oxidation in a lean exhaust environment via the methane oxidation catalyst is also provided.

12 Claims, 1 Drawing Sheet

HYDROTHERMALLY STABLE METHANE OXIDATION CATALYST

CROSS-REFERENCE TO RELATED APPLICATIONS

This application claims the benefit of U.S. Provisional Application No. 63/186,965, filed May 11, 2021, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to lean-burn natural gas emissions control, and more particularly to methane oxidation catalysts for lean exhaust environments.

BACKGROUND OF THE INVENTION

Natural gas has garnered tremendous attention as an alternative to traditional fossil fuels due to its abundance, cost-effectiveness and versatility of use in the transportation, power generation, marine, and manufacturing sectors. Methane ($CH_4$), the primary component of natural gas, has a low carbon content and emits less $CO_2$ per unit energy generated compared to other carbon-intensive fossil fuels. Furthermore, natural gas-fueled, lean-burn engines operating under high air-to-fuel ratios ($\lambda>1$) have better thermal efficiencies, can reduce fuel consumption, and have cleaner engine-out exhausts than conventional stoichiometric engines. However, exhaust streams from natural gas, lean-burn engines still contain deleterious pollutants as excess air in the combustion chamber can lead to formation of nitrogen oxides and can cause methane to slip due to incomplete combustion. Ultra-lean ($\lambda>1.6$) combustion strategies can potentially lower in-cylinder temperatures, which can help further reduce heat losses, increase thermal efficiency and also alleviate $NO_x$ formation. However, ultra-lean combustion can still pose the issue of incomplete combustion that results in unburned methane. Further, future regulations for methane emissions are likely to be even more stringent as the global warming potential (GWP) of methane is approximately 25 times that of $CO_2$ which makes abatement of methane emissions imperative to taking advantage of the potential of lean-burn natural gas engines to significantly mitigate greenhouse gas emissions.

Methane, being a stable, non-polar, saturated hydrocarbon with a C—H bond dissociation energy of approximately 435 kJ/mol, makes activation by hydrogen abstraction, and in turn methane oxidation, challenging at low temperatures relevant to highly efficient lean-burn natural gas engine-exhaust. Further, the existence of high concentrations of water vapor (>10%) in natural gas engine-exhaust can inhibit methane oxidation as water competes with methane for the active sites and can hinder methane activation until water desorbs from the surface of the catalysts. Moreover, CO and NO present in the engine-exhaust compete for the active sites in the oxidation catalyst along with $CH_4$ and can lead to multi-component competitive adsorption behavior on the catalyst. Additionally, carbon dioxide ($CO_2$), which is a product of combustion, can strongly adsorb on basic sites active for methane activation on an oxidation catalyst, which leads to poisoning of the catalyst. Preferential or stronger adsorption of one species over another within a temperature range on the surface of the catalyst can impact oxidation of the other components in the exhaust gas stream. The high exothermicity ($\Delta H°_{298K}=-800$ kJ/mol) of methane combustion and susceptibility to water poisoning calls for a hydrothermally stable and durable catalyst to oxidize methane. Therefore, a need exists for a methane oxidation catalysis that is hydrothermally stable and demonstrates efficiency in methane conversion at low temperatures in the presence of water vapor, $CO_2$, CO, and/or NO.

SUMMARY OF THE INVENTION

A methane oxidation catalyst and a method of manufacturing the methane oxidation catalyst are disclosed. The methane oxidation catalyst includes a support, palladium (Pd) dispersed onto the support, and magnesium (Mg) dispersed onto the support. The support having Pd and Mg dispersed thereon is subjected to hydrothermal calcination.

In particular embodiments, the support is one of: (i) a small-pore zeolite having a $SiO_2:Al_2O_3$ ratio of 10:1 or greater; and (ii) a high surface area $Al_2O_3$.

In specific embodiments, the small-pore zeolite is a SSZ-13 zeolite.

In particular embodiments, a molar ratio of magnesium to palladium (Mg:Pd) in the catalyst is in the range of 1:1 to 3:1.

The method includes providing a palladium (Pd)-based catalyst including Pd dispersed onto a support. The method further includes introducing a magnesium (Mg) precursor to the Pd-based catalyst by one of ion exchange or incipient wetness impregnation. After introducing the magnesium precursor to the Pd-based catalyst, the method includes drying the catalyst and subjecting the catalyst to a final heat treatment.

In particular embodiments, the step of providing a Pd-based catalyst includes introducing a Pd precursor to the support.

In specific embodiments, the Pd precursor is Pd $(NO_3)_2 \cdot 2H_2O$.

In specific embodiments, the support is a small-pore zeolite having a $SiO_2:Al_2O_3$ ratio of 10:1 or greater.

In specific embodiments, the Pd precursor is introduced to the support by one of ion exchange or incipient wetness impregnation.

In certain embodiments, the Pd precursor is dispersed onto the support in an amount in the range of 1 to 5 wt. %.

In certain embodiments, the Pd precursor and Mg precursor are added sequentially, in that order.

In certain embodiments, prior to the addition of the Mg precursor, the Pd-based catalyst is subjected to an intermediate heat treatment that is hydrothermal calcination performed at a temperature in the range of 400 to 800° C. for a time period of 4 hours or more in the presence of water, oxygen, and nitrogen.

In particular embodiments, the support is a high surface area $Al_2O_3$.

In particular embodiments, the Mg precursor is Mg $(NO_3)_2 \cdot 6H_2O$.

In particular embodiments, the molar ratio of Mg:Pd in the catalyst is in the range of 1:1 to 3:1.

In particular embodiments, the final heat treatment is hydrothermal calcination performed at a temperature in the range of 400 to 800° C. for a time period of 4 hours or more in the presence of water, oxygen, and nitrogen.

A methane oxidation catalyst formed by the method is also disclosed.

Further, a method of methane oxidation in a lean exhaust environment is disclosed. The method includes providing the methane oxidation catalyst formed by the embodiments above. The method also includes introducing the methane oxidation catalyst to the lean exhaust environment, wherein unburned methane present in the lean exhaust environment is oxidized on the methane oxidation catalyst.

In particular embodiments, the lean exhaust environment is an exhaust stream from a natural gas, lean-burn engine.

These and other features of the invention will be more fully understood and appreciated by reference to the description of the embodiments and the drawings.

DETAILED DESCRIPTION OF THE CURRENT EMBODIMENTS

Figure 1:
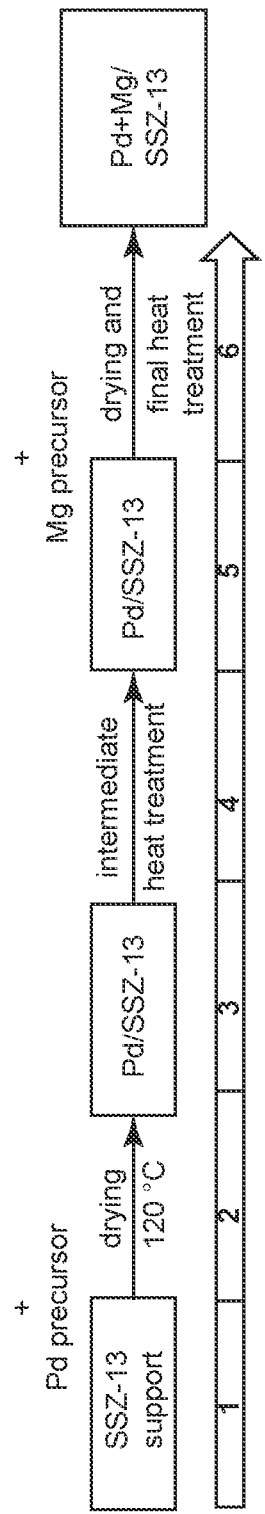
FIG. 1 is a schematic illustration of a method of manufacturing a methane oxidation catalyst in accordance with some embodiments of the disclosure.
Figure 2:
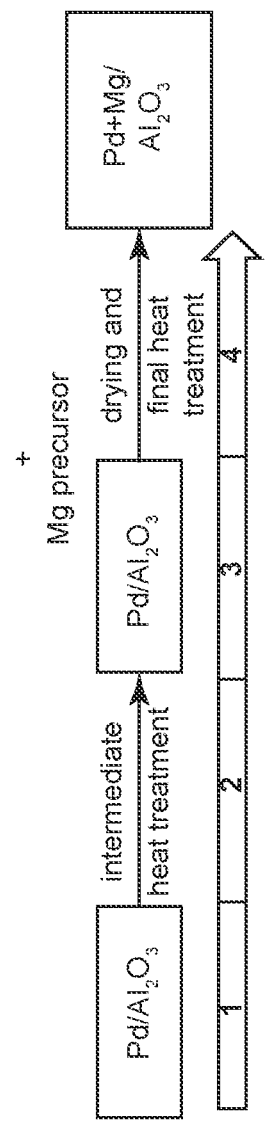
FIG. 2 is a schematic illustration of a method of manufacturing a methane oxidation catalyst in accordance with other embodiments of the disclosure.

As discussed herein, the current embodiments relate to a methane oxidation catalyst, a method of manufacturing the methane oxidation catalyst, and a method of methane oxidation in a lean exhaust environment using the methane oxidation catalyst. As generally illustrated in FIGS. 1 and 2, the method includes providing a palladium (Pd)-based catalyst including Pd dispersed onto a support, introducing a magnesium (Mg) precursor to the Pd-based catalyst by one of ion exchange or incipient wetness impregnation, and after introducing the magnesium precursor to the Pd-based catalyst, drying the catalyst and subjecting the catalyst to a final heat treatment. Each step is separately discussed below.

The method first includes providing a palladium (Pd)-based catalyst including palladium dispersed onto a support. The support may be a small-pore zeolite having a silicon to aluminum ($SiO_2:Al_2O_3$) ratio of 10:1 or greater. For example, the small-pore zeolite may be a SSZ-13 zeolite. The $SiO_2:Al_2O_3$ ratio of the small-pore zeolite may be in the range of 10:1 to 15:1, more particularly between 10:1 and 12:1. Small-pore zeolites have pores constructed of eight tetrahedral atoms ($SO^{4+}$ and $Al^{3+}$) that are linked by a shared oxygen (O), the pore diameter being 12 Å or less. The eight-member ring pores (8MR) of small-pore zeolites provide small molecules access to the intracrystalline void space, while restricting entrance and departure of larger molecules. The surface area of the small-pore zeolite may be greater than 500 $m^2/g$. Alternatively, the support may be a high surface area alumina ($Al_2O_3$), for example a γ-alumina. A high surface area alumina may have a surface area generally greater than 90 $m^2/g$, preferably a surface area in the range of 100 to 700 $m^2/g$, more preferably greater than 200 $m^2/g$, more preferably greater than 300 $m^2/g$, even more preferably greater than 400 $m^2/g$. The alumina may have a broad pore size distribution in the mesopore range (16-180 Å).

The Pd-based catalyst may be pre-manufactured prior to conducting the method. Alternatively, the step of providing the Pd-based catalyst may include introducing a Pd precursor to the support. The Pd precursor may be, for example, $Pd(NO_3)_2 \cdot 2H_2O$ that is introduced to the support by one of ion exchange or incipient wetness impregnation. The ion exchange or incipient wetness steps are performed according to standard, conventional methods. The Pd precursor is loaded and dispersed onto the support in an amount in the range of 1 to 5 wt. %, more preferably in the range of 1.5 to 2.5 wt. %, even more preferably approximately 2 wt. %. After the Pd precursor is added to the support the Pd+support may be dried at a temperature in the range of 100 to 140° C., preferably approximately 120° C. for a time period of at least 1 hour, preferably at least 2 hours, more preferably between 2 and 5 hours, and then optionally may be subjected to an intermediate heat treatment that is hydrothermal calcination performed at a temperature in the range of 400 to 800° C., preferably between 450 and 600° C., for a time period of 4 hours or more in the presence of water, oxygen, and nitrogen.

Once the Pd-based catalyst is obtained, a magnesium (Mg) precursor is introduced to the Pd-based catalyst by either ion exchange or incipient wetness impregnation. Preferably, the Pd precursor and Mg precursor are added to the support sequentially, in that order. However, alternatively the Pd precursor and the Mg precursor may be introduced to the support simultaneously. The Mg precursor may be, for example, $Mg(NO_3)_2 \cdot 6H_2O$. The resulting molar ratio of Mg:Pd in the obtained catalyst is in the range of 1:1 to 3:1, preferably in the range of 1:1 to 2:1.

After Mg is added to the Pd-catalyst support, the Mg+Pd catalyst is dried and then subjected to a final heat treatment. The step of drying may be performed at a temperature in the range of 100 to 140° C. for a time period of at least 1 hour, preferably at least 2 hours, more preferably between 2 and 5 hours. The drying step removes excess water from the support, which leads to the formation of a better catalyst product. The final heat treatment is hydrothermal calcination performed at a temperature in the range of 400 to 800° C., preferably between 450 and 600° C., for a time period of 4 hours or more in the presence of water, oxygen, and nitrogen. Hydrothermal calcination, as opposed to dry calcination, is beneficial to the formation of the final methane oxidation catalyst including Pd and Mg dispersed on the support.

The methane oxidation catalyst formed by the method above is effective for converting methane to carbon dioxide and water, such as for oxidizing unburned methane present in lean exhaust environments such as the exhaust gas stream of a natural gas, lean-burn (air/fuel ratio λ>1) engine. Complete oxidation of methane at lower temperatures (e.g., below 550° C.) in lean exhaust environments is difficult due to the high stability of the C—H bond in the methane molecule (which also does not include any C—C bonds), in addition to the high concentration of water (greater than 10%) and other combustion byproducts such as CO, $NO_x$, and $SO_x$. The methane oxidation catalyst according to the disclosed embodiments, however, overcomes these obstacles to methane abatement in lean exhaust streams, thereby increasing the environmental viability of natural gas engines.

While the catalyst has been described as being a methane oxidation catalyst, it should be understood that the catalyst may be applicable for oxidation of other larger hydrocarbons, for example alkanes with more than one carbon such as ethane, propane, and so on. Since the C—H bond in methane is harder to break than the C—H bonds or C—C bonds in hydrocarbon chains, if the methane oxidation catalyst is effective for oxidizing methane, it may also be effective for oxidizing non-methane hydrocarbons.

EXAMPLES

The present method is further described in connection with the following laboratory examples, which are intended to be non-limiting.

Methane oxidation catalysts according to particular embodiments of the disclosure were prepared by both incipient wetness impregnation and ion exchange. For the catalysts in which magnesium was added by incipient wetness impregnation, both zeolite and alumina supports were used. The zeolite support was an SSZ-13 zeolite (ACS Materials; CAS # 1318-02-01) having a $SiO_2:Al_2O_3$ ratio of 10:1. The alumina catalysts were prepared using $Pd/Al_2O_3$ obtained from Sigma-Aldrich. Palladium was loaded on the SSZ-13 support by either ion exchange (I.E.) or incipient wetness impregnation (I.W.) by standard, conventional synthesis methods using $Pd(NO_3)_2 \cdot 2H_2O$ (Sigma-Aldrich; CAS # 32916-07-7) as the palladium precursor. Magnesium was subsequently added by incipient wetness impregnation using $Mg(NO_3)_2 \cdot 6H_2O$ (Sigma-Aldrich; CAS # 13446-18-9) as the magnesium precursor, except in one case in which palladium and magnesium were added to the SSZ-13 zeolite support together by co-incipient wetness impregnation using a mixed nitrate solution. Magnesium was added to the alumina support Pd by incipient wetness impregnation. The catalysts were dried in an oven at approximately 120° C. to remove surface bound water before I.W. addition of both palladium and magnesium. All of the resulting methane oxidation catalysts contained a palladium loading of one weight percent (1 wt. %) and a magnesium loading of between 0.5:1 and 1.5:1 as a molar ratio of magnesium to the 1 wt. % palladium.

For the catalysts prepared by ion exchange, palladium or magnesium was ion exchanged (I.E.) with the as-received $NH_4$ form of SSZ-13 following standard, conventional synthesis methods. The SSZ-13 was added to a transparent, yellowish brown aqueous palladium nitrate solution (0.005M) or a clear, colorless magnesium nitrate solution (0.002M). The metal/SSZ-13 mixture was refluxed in an 80° C. oil bath for 24 hours. The palladium was ion exchanged at 1 wt. % while the magnesium was ion-exchanged at a 1 wt. % palladium molar equivalence of 0.5. After cooling, the mixture was filtered, washed with deionized (DI) water, and left to air dry. The filtrate was centrifuged and filtered until all of the powdered catalyst was collected by filtration. The supernatants were clear and colorless for both the palladium and magnesium ion exchanged catalysts. The air-dried powders were then dried in an oven at approximately 120° C. for 4.5 hours. The Pd/SSZ-13 (I.E.) powder obtained was a light tan with a pinkish tint while the Mg/SSZ-13 (I.E.) powder was white.

The examples are summarized in Table 1 below, with the comparative examples being those with no magnesium addition. Unless otherwise noted, all the catalysts were hydrothermally aged in a tube furnace before testing. Table 1 lists the heat treatments and naming nomenclature for each catalyst. During aging, the powdered catalysts were placed in a ceramic boat and centered in a quartz tube inside a horizontal tube furnace with a thermocouple located inside the quartz tube in a space above the ceramic boat for temperature control. A synthetic gas feed of oxygen and nitrogen controlled by MKS mass flow controllers at 5000 standard cubic centimeters per min (sccm) was sent across the catalyst while the furnace was ramped at 2° C./min to either 500° C. for 4 hours or 700° C. for 15 hours. Once the temperature reached 120° C., water vapor was added to the gas feed using a HPLC pump (Eldex Laboratories). After water vapor was introduced, the feed composition was 15% $O_2$, 10% $H_2O$ with a $N_2$ balance. In some cases, the catalyst was subjected to two heat treatments, which are described in Table 1 and FIGS. 1 and 2 as an intermediate and final heat treatment. For sequential bimetallic catalysts, the intermediate treatment was done on the supported palladium-only catalyst while the final treatment occurred after the magnesium was added to the supported palladium catalyst.

TABLE 1

Synthesized methane oxidation catalysts and catalyst light-off temperature summary

| Catalysts Synthesized | Mg Addition[a] | Pd:Mg | Heat Treatment (° C.) (700° C.-15 h/500° C.-4 h) Intermediate | Final | Total Aging (h) | $T_{50}$ \| $T_{90}$ (° C.) |
|---|---|---|---|---|---|---|
| Pd (I.E.)/SSZ-13 supported Catalysts | | | | | | |
| Pd(I.E.)/SSZ-13 HTA 500 C. | — | 1:0 | — | 500 | 4 | 471 \| >600 |
| Pd(I.E.)/SSZ-13 cal. 500 C.-HTA 700 C. | — | 1:0 | 500 [b] | 700 | 15 | 484 \| >600 |
| Pd(I.E.)/SSZ-13 HTA 700 C. | — | 1:0 | — | 700 | 15 | 461 \| >600 |
| Pd(I.E.) + Mg/SSZ-13 HTA 500 C. | Seq. I.W. | 1:1 | 700 | 500 | 19 | >600 |
| Pd (I.W.)/SSZ-13 supported Catalysts | | | | | | |
| Pd(I.W.)/SSZ-13 HTA 500 C. | — | 1:0 | — | 500 | 4 | 515 \| 600 |
| Pd(I.W.) + Mg/SSZ-13 HTA 500 C. | Seq. I.W. | 1:1 | 500 | 500 | 8 | 499 \| 557 |
| Pd(I.W.)_Mg/SSZ-13 HTA 500 C. | Seq. I.W. | 1:1 | 120 [c] | 500 | 4 | 505 \| 559 |
| PdMg(co-I.W.)/SSZ-13 HTA 500 C. | Co-I.W. | 1:1 | — | 500 | 4 | 576 \| >600 |
| Sigma Aldrich ($Pd/Al_2O_3$) | | | | | | |
| $Pd/Al_2O_3$ HTA 500 C. | — | 1:0 | — | 500 | 4 | 404 \| 433 |
| $Pd/Al_2O_3$ HTA 700 C. | — | 1:0 | — | 700 | 15 | 411 \| 466 |
| Pd + $Mg/Al_2O_3$ HTA 500 C. | Seq. I.W. | 1:1 | 500 | 500 | 8 | 409 \| 450 |
| 1.0Pd + 0.5$Mg/Al_2O_3$ HTA 700 C. | Seq. I.W. | 1:0.5 | 700 | 700 | 30 | 438 \| 574 |
| 1.0Pd + 1.0$Mg/Al_2O_3$ HTA 700 C. | Seq. I.W. | 1:1 | 700 | 700 | 30 | 406 \| 454 |
| 1.0Pd + 1.5$Mg/Al_2O_3$ HTA 700 C. | Seq. I.W. | 1:1.5 | 700 | 700 | 30 | 411 \| 461 |

[a] "Seq." refers to the sequential I.W. addition of Mg;
[b] calcined under air;
[c] dried under air As summarized in Table 1, the methane oxidation catalyst samples were evaluated under full synthetic exhaust-gas composition as per industry guidelines delineated in the U.S. Drive low-temperature oxidation catalyst test protocol. A bank of mass flow controllers (MKS instruments and Teledyne Hastings) was used to simulate the full synthetic exhaust conditions under which the methane oxidation experiments were conducted. A stream of argon (Ar) was saturated by flowing it through a water bubbler in a recirculating bath set to 62° C. to introduce 12% $H_2O$ in a preheated gas feed containing 9% $O_2$, 6% $CO_2$, 3000 ppm $CH_4$, 2000 ppm CO, 500 ppm NO during the light-off experiments. The gas lines in the reactor system were maintained at ~200° C. to eliminate condensation of water or adsorption of reactants. The total flow rate to the reactor was 333 sccm and a gas hourly space velocity of 200 L/g-h was maintained. The gas composition of the reactor feed and product stream was measured using a MKS Instruments Multigas 2030HS FTIR spectrometer. To improve the response times within the FTIR, the gas stream from the inlet or outlet of the reactor was diluted by 666 sccm Ar before being analyzed by the FTIR.

After aging the catalysts where applicable, catalyst powder was ground and sieved to obtain particle sizes between 150 and 250 μm to avoid channeling and elevated pressure drop effects. 100 mg of catalyst was loaded into a U-tube reactor (8 mm i.d.). A K-type thermocouple was placed 0.5 cm upstream of the sample while another K-type thermocouple was positioned in the center of the powder bed to measure and record the catalyst inlet and catalyst bed temperatures respectively. An additional K-type thermocouple, external to the reactor tube, was used to give feedback to the temperature controller of the resistively heated furnace into which the catalyst was loaded for the light-off experiments.

The catalyst samples were first pretreated under oxidizing conditions at 600° C. for 20 minutes, then cooled down under the same conditions to 300° C. at which point the remaining constituents of the synthetic exhaust-gas mixture were switched on. After stabilization of the catalyst temperature and reactant flows, the catalyst inlet temperature was ramped at 5° C./min to 600° C. From the methane oxidation light-off curve obtained during the experiment, the catalyst inlet temperatures at which 50% (T50) and 90% conversion (T90) of methane were achieved was used to compare the methane oxidation efficiency of the catalyst samples.

The mode of introduction of palladium into a zeolite support such as SSZ-13 has been found to significantly impact the state of the palladium in the catalyst, which, in turn influences the performance of catalyst. Palladium was first introduced to the SSZ-13 support via the ion-exchange method (Pd (I.E.)/SSZ-13) to facilitate high palladium dispersion in the zeolite support. Typically, catalyst synthesis involves a calcination treatment step to stabilize and activate the final form of the catalyst. Prior to evaluating the catalysts for methane oxidation activity, two modes of hydrothermal aging were adopted: (i) mild aging at 500° C. for 4 h (HTA 500C) and (ii) severe aging at 700° C. for 15 h (HTA 700C). For comparison with traditional oxidation catalysts, an additional sample was evaluated which was calcined under air at 500° C. followed by severe aging at 700° C. for 15 h (calcined@500C-HTA 700C).

Following hydrothermal aging, the catalytic oxidation activity of the Pd(I.E.)/SSZ-13 catalyst samples were evaluated under full synthetic exhaust conditions relevant to lean natural-gas fueled engines. To test the catalytic activity for low-temperature methane oxidation, the catalyst samples were compared based on their light-off behavior for methane. The methane oxidation performance of the catalysts was quantified based on their $T_{50}$ and $T_{90}$ (temperature at which 50% and 90% methane is oxidized on the catalyst, respectively). The $T_{50}$ after mild hydrothermal aging of Pd(I.E.)/SSZ-13 at 500° C. (HTA 500C) is ~471° C. while severe hydrothermal aging (HTA 700C) marginally decreases the $T_{50}$ to 461° C. However, in the case of the catalyst with the calcination step (calcined@500C-HTA 700C), the $T_{50}$ was significantly higher at 484° C. Calcination under air at 500° C. of the Pd(I.E.)/SSZ-13 catalyst likely facilitated Pd migration from the ion-exchange sites in the zeolite and underwent sintering, resulting in a loss of Pd/$PdO_x$ active sites could provide a possible explanation for the higher $T_{50}$ observed in the case of the calcined catalyst. None of the formulations reached $T_{90}$ for methane oxidation under the synthetic exhaust conditions and in fact an onset of decline in methane oxidation activity was observed at the highest temperature likely due to available $PdO_x$ active sites transitioning to less active palladium metallic particles.

To exploit the hydrophobic nature of the SSZ-13 as a support to mitigate the water inhibition effect on methane oxidation and to increase the methane combustion active $PdO_x$ sites, palladium was introduced to the SSZ-13 support using incipient wetness impregnation (Pd (I.W.)/SSZ-13). The resulting catalyst was hydrothermally aged at 500° C. (HTA 500C) and evaluated for its methane oxidation efficacy. On comparing the $T_{50}$ of the I.W. catalyst with the hydrothermally-aged (HTA 500C) palladium that was ion-exchanged into SSZ-13 (I.E.), an elevated $T_{50}$ is observed in the case of I.W. catalyst ($\Delta T50$ ~44° C.). However, 90% methane oxidation was achieved by 600° C. ($T_{90}$) when palladium was introduced to SSZ-13 via the I.W. method unlike the I.E. catalyst which did not achieve 90% conversion of methane within the temperature range of investigation. When palladium is introduced to SSZ-13 via an I.W. method, palladium likely forms $PdO_x$ particles on the SSZ-13 support rather than palladium cations dispersed in the zeolite framework in the case of palladium ion-exchanged into SSZ-13 (I.E.). The lower $T_{90}$ of the Pd (I.W.)/SSZ-13 catalyst may be due to the presence of $PdO_x$ particles on SSZ-13.

Magnesium was introduced to the aged Pd(I.E.)/SSZ-13 and Pd(I.W.)/SSZ-13 catalysts via incipient wetness impregnation as discussed above. The magnesium-incorporated catalysts, Pd(I.E.)+Mg/SSZ-13 and Pd(I.W.)+Mg/SSZ-13 were subjected to additional hydrothermal aging at 500° C. (HTA 500C) and their methane light-off temperatures were measured from 300° C. to 600° C. under synthetic exhaust conditions. Incorporation of magnesium into Pd(I.E.)/SSZ-13 pushes the $T_{50}$ for methane oxidation to temperatures higher than 600° C. As magnesium was added to Pd(I.E.)/SSZ-13 via an incipient wetness impregnation method, the loss in methane oxidation activity of Pd(I.E.)+Mg/SSZ-13 is likely due to formation of magnesium particles on SSZ-13 after aging which could in turn cause pore blockage and prevent access to the palladium sites within the zeolite framework. Furthermore, minimal methane oxidation was observed on aged magnesium ion-exchanged into SSZ-13 (not shown) which indicates that magnesium by itself does not exhibit promising methane oxidation activity. However, the beneficial effect of addition of magnesium to Pd(I.W.)/SSZ-13 on methane conversion is demonstrated where both methane oxidation $T_{50}$ and $T_{90}$ for the Pd(I.W.)+Mg/SSZ-13 catalyst are lower than Pd(I.W.)/SSZ-13 ($\Delta T_{50}$ ~16° C. and $\Delta T_{90}$ 43° C.). The superior methane conversion on Pd(I.W.)+

Mg/SSZ-13 catalyst is likely attributed to the synergistic effect of the proximity between the palladium and magnesium particles on SSZ-13 after aging the sample where magnesium may aid in hydrogen abstraction from methane which is subsequently oxidized by the Pd/PdO$_x$ particles. For all the samples, complete CO oxidation was observed below 300° C. Notably, no formaldehyde formation was observed for I.W catalysts during methane oxidation.

Furthermore, to understand the effect of the route of magnesium addition to Pd(I.W.)/SSZ-13 on methane oxidation efficiency of the resulting catalyst, three modes of magnesium incorporation were adopted. Magnesium was either sequentially added via incipient wetness impregnation to Pd(I.W.)/SSZ-13 HTA 500C or dried Pd(I.W.)/SSZ-13 or co-impregnated with palladium on the SSZ-13 support. All the catalysts were then aged at 500° C. before being evaluated for their methane oxidation performance (HTA 500C). Sequential incorporation of magnesium to either Pd(I.W.)/SSZ-13 HTA 500 C or dried Pd(I.W.)/SSZ-13 resulted in comparable $T_{50}$ and $T_{90}$ for methane conversion and both magnesium-containing catalysts demonstrated higher methane oxidation activity than the Pd(I.W.)/SSZ-13 HTA 500 C sample. On the other hand, a significantly higher $T_{50}$ (576° C.) and $T_{90}$ (>600° C.) for methane oxidation was observed in the case of PdMg(co-I.W.)/SSZ-13 HTA 500 C catalyst compared to the palladium only and the sequential magnesium incorporated samples. Co-impregnation of palladium and magnesium on SSZ-13 can lead to possibly one species preferentially being impregnated on the SSZ-13 support depending on the precipitation characteristics of the precursors used. Moreover, the Pd+Mg(I.W.)/SSZ-13 sample also demonstrated superior hydrothermal stability than PdMg (co-I.W.)/SSZ-13 as the former catalyst was exposed to hydrothermal aging conditions at 500° C. for 8 hours and exhibited better methane oxidation efficiency whereas the latter sample was aged for 4 hours and had lower activity for methane conversion.

In order to gain insights into how oxidation catalysts such as Pd/Al$_2$O$_3$ compare with the Pd(I.W.)/SSZ-13 catalyst in terms of methane conversion efficiency under lean conditions, Pd/Al$_2$O$_3$ was hydrothermally aged at 500° C. and its methane light-off behavior was investigated. After aging, Pd/Al$_2$O$_3$ demonstrated promising lean methane oxidation activity under synthetic exhaust conditions with both $T_{50}$ and $T_{90}$ for methane conversion being lower than Pd(I.W.)/SSZ-13 HTA 500C ($\Delta T_{50}$~111° C. and $\Delta T_{90}$~167° C.). For the same palladium loading, Pd/PdO$_x$ particles on Al$_2$O$_3$ are likely more accessible than those on SSZ-13 supported catalysts as hydrothermal aging of palladium-based zeolites can potentially lead to migration of a fraction of the palladium particles into the zeolite cage and result in partial loss of palladium particles due to transformation to cationic palladium at the ion-exchange sites within the zeolite. The higher methane conversion efficiency of Pd/Al$_2$O$_3$ compared to Pd(I.W.)/SSZ-13 provides further evidence of Pd/PdO$_x$ particles being more effective at methane oxidation compared to Pd cations as the Al$_2$O$_3$ catalyst only has Pd/PdO$_x$ particles on the surface.

In order to gain insights into the impact of hydrothermal aging on methane conversion activity, Pd/Al$_2$O$_3$ was exposed to 10% water vapor at 700° C. for 15 hours (HTA 700C) under lean conditions prior to performance evaluation under synthetic exhaust conditions. Comparison of methane oxidation activity between Pd/Al$_2$O$_3$ HTA 500C and Pd/Al$_2$O$_3$ HTA 700C showed that both $T_{50}$ and $T_{90}$ increase when the catalyst is subjected to hydrothermal aging at 700° C. ($\Delta T_{50}$~8° C. and $\Delta T_{90}$~25° C.). The light-off curve for fresh Pd/Al$_2$O$_3$, on the other hand, showed earlier onset of methane oxidation at lower temperatures and deterioration in catalyst activity on prolonged exposure to reaction conditions, leading to high $T_{90}$'s comparable to the aged samples.

Magnesium was then incorporated sequentially via incipient wetness impregnation into both the aged Pd/Al$_2$O$_3$ samples and the resulting catalysts were subjected to further aging at 500° C. and 700° C. respectively before they were evaluated for their methane conversion efficiency. Notably, the Pd+Mg/Al$_2$O$_3$ HTA 500C was exposed to aging conditions for a total of 8 hours while the Pd+Mg/Al$_2$O$_3$ HTA 700C sample was subjected to hydrothermal aging for a total of 30 hours. While $T_{50}$ and $T_{90}$ of Pd+Mg/Al$_2$O$_3$ HTA 500C were slightly higher than those of Pd/Al$_2$O$_3$ HTA 500C ($\Delta T_{50}$ ~6° C. and $T_{90}$ ~11° C.), magnesium addition was found to improve the hydrothermal stability and methane oxidation $T_{50}$ and $T_{90}$ of the Pd+Mg/Al$_2$O$_3$ samples aged at 700° C. (($\Delta T_{50}$ ~5° C. and $T_{90}$ ~7° C.).

In summary, for the disclosed methane oxidation catalysts having an SSZ-13 support, hydrothermal aging of ion-exchanged (I.E.) Pd/SSZ-13 resulted in comparatively lower $T_{50}$ for methane oxidation than the catalyst subjected to traditional calcination treatment under air likely due to agglomeration of PdO$_x$ particles in the latter sample with thermal exposure. Further, palladium introduced to SSZ-13 via incipient wetness impregnation (I.W.) had lower methane oxidation $T_{90}$ than the I.E. method after hydrothermal aging at 500° C. which indicated that Pd/PdO$_x$ particles were better than cationic Pd$^{2+}$ for methane oxidation at high temperatures under lean exhaust-relevant conditions. Furthermore, magnesium addition to Pd(I.W.)/SSZ-13 catalysts was beneficial in lowering both $T_{50}$ and $T_{90}$ for lean methane oxidation and may be associated with the formation of highly reducible, active Pd/PdO$_x$ sites outside the zeolite cage, which may have been prevented from excessive agglomeration upon further aging due to the influence of magnesium. Also, sequential addition of magnesium to Pd(I.W.)/SSZ-13, irrespective of the thermal history of the base catalyst, was more effective in improving methane oxidation efficiency. For the disclosed methane oxidation catalysts having an alumina support, Pd/Al$_2$O$_3$ catalysts hydrothermally aged at 500° C. demonstrated significantly higher activity for methane oxidation compared to their SSZ-13 supported counterparts likely due to high dispersion of Pd/PdO$_x$ particles making the active sites more accessible and with a higher fraction of more active palladium (1 0 0) facets exposed on redispersion under oxidizing conditions. Further, high temperature aging of the Mg-free Al$_2$O$_3$ supported catalysts under wet conditions at 700° C. resulted in deterioration in methane oxidation activity. Furthermore, experimental results have suggested that the improved hydrothermal stability of magnesium incorporated Pd/Al$_2$O$_3$ demonstrated by the lower $T_{50}$ and $T_{90}$ for lean methane oxidation even after the longest exposure to hydrothermal aging conditions at 700° C. is due to the influence of Mg during surface roughening and restructuring of Pd/Al$_2$O$_3$ on severe hydrothermal aging which can hinder excessive sintering and can lead to active palladium (1 0 0) facets being preferentially exposed.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of manufacturing a methane oxidation catalyst, the method comprising:
   providing a palladium (Pd)-based catalyst including Pd dispersed onto a support;
   introducing a magnesium (Mg) precursor to the Pd-based catalyst by one of ion exchange or incipient wetness impregnation; and
   after introducing the magnesium precursor to the Pd-based catalyst, drying the catalyst and subjecting the catalyst to a final heat treatment;
   wherein the final heat treatment is hydrothermal calcination performed at a temperature in the range of 400 to 800° C. for a time period of 4 hours or more in the presence of water, oxygen, and nitrogen.

2. The method of claim 1, wherein the step of providing a Pd-based catalyst includes introducing a Pd precursor to the support.

3. The method of claim 2, wherein the Pd precursor is $Pd(NO_3)_2 \cdot 2H_2O$.

4. The method of claim 2, wherein the support is a small-pore zeolite having a $SiO_2:Al_2O_3$ ratio of 10:1 or greater.

5. The method of claim 2, wherein the Pd precursor is introduced to the support by one of ion exchange or incipient wetness impregnation.

6. The method of claim 5, wherein the Pd precursor is dispersed onto the support in an amount in the range of 1 to 5 wt. % based on the weight of the support.

7. The method of claim 5, wherein the Pd precursor and Mg precursor are added sequentially, in that order.

8. The method of claim 1, wherein the support is a high surface area $Al_2O_3$ having a surface area greater than 90 $m^2/g$.

9. The method of claim 1, wherein the Mg precursor is $Mg(NO_3)_2 \cdot 6H_2O$.

10. The method of claim 1, wherein the molar ratio of Mg:Pd in the catalyst is in the range of 1:1 to 3:1.

11. The method of claim 1, wherein the step of drying the catalyst is performed at a temperature in the range of 100 to 140° C. for a time period of between 2 and 5 hours.

12. A method of manufacturing a methane oxidation catalyst, the method comprising:
   providing a palladium (Pd)-based catalyst including Pd dispersed onto a support;
   introducing a magnesium (Mg) precursor to the Pd-based catalyst by one of ion exchange or incipient wetness impregnation; and
   after introducing the magnesium precursor to the Pd-based catalyst, drying the catalyst and subjecting the catalyst to a final heat treatment;
   wherein the step of providing a Pd-based catalyst includes introducing a Pd precursor to the support;
   wherein the Pd precursor is introduced to the support by one of ion exchange or incipient wetness impregnation;
   wherein the Pd precursor and Mg precursor are added sequentially, in that order;
   wherein prior to the addition of the Mg precursor, the Pd-based catalyst is subjected to an intermediate heat treatment that is hydrothermal calcination performed at a temperature in the range of 400 to 800° C. for a time period of 4 hours or more in the presence of water, oxygen, and nitrogen.

* * * * *